Sept. 18, 1956     A. H. BOWLES     2,763,381
PARKAWAY MOTOR LODGE
Filed Sept. 16, 1955     8 Sheets-Sheet 1

INVENTOR.
Alfred H. Bowles
BY
Atty.

Sept. 18, 1956 A. H. BOWLES 2,763,381
PARKAWAY MOTOR LODGE
Filed Sept. 16, 1955 8 Sheets-Sheet 3

INVENTOR.
Alfred H. Bowles
BY
Atty.

Sept. 18, 1956     A. H. BOWLES     2,763,381
PARKAWAY MOTOR LODGE

Filed Sept. 16, 1955            8 Sheets-Sheet 4

INVENTOR.
Alfred H. Bowles
BY
Atty.

INVENTOR.
Alfred H. Bowles
BY
Atty.

Sept. 18, 1956      A. H. BOWLES      2,763,381
PARKAWAY MOTOR LODGE

Filed Sept. 16, 1955      8 Sheets-Sheet 7

INVENTOR.
Alfred H. Bowles
BY
Gretel Wells
Atty.

United States Patent Office 2,763,381
Patented Sept. 18, 1956

2,763,381

PARKAWAY MOTOR LODGE

Alfred H. Bowles, Spokane, Wash.

Application September 16, 1955, Serial No. 534,679

8 Claims. (Cl. 214—16.1)

The present invention relates to a parkaway motor lodge.

With the present congestion in cities due to the continually increasing use of automobiles, the traveller by automobile is severely handicapped by his inability to find a place for both his car and himself to spend the night. The motor courts and motels provide lodging with automobile space but they require so much space that they are not economically feasible for congested areas. The result has been that those automobile travellers requiring lodging in the congested areas use hotels but find themselves handicapped for lack of accommodations for their automobiles. Hotels have provided nearby parking space and in some instances, limited parking space within the hotel itself. Such measures as have been taken are inadequate. In order to permit his automobile to be parked, the guest has to leave the automobile unlocked and permit it to be operated by the hotel attendants free of his supervision. The opportunity for pilfering the car contents and the opportunity for damage to the car itself afforded by this method, discourages the use of such facilities by the hotel guests.

The purpose of my invention is to provide a novel multiple story motel having within it the facilities for lodging and for storing the locked automobiles of the guests so that the guest upon arriving can drive into a car lobby, leaving his car locked in a position to be lifted and stored away, after removing whatever luggage, etc. that is wanted in the room. The motel is so constructed as to provide each rental space with bath room and sleeping room facilities, an outside hall entrance, a front door and porch area overlooking the entrance, all with a minimum wall overlap between adjoining sleeping rooms. All of the rental units have a front door facing toward the front of the motel, but the side and back walls of the structure preferably are unbroken by windows or doors so as to exclude noise, dirt, etc. The construction makes it possible to erect the motor court in a built up area where the outer walls are directly against the side walls of existing buildings, and in any crowded space without regard to rear and side views.

The nature and advantages of my invention will appear more fully from the following description and the accompanying drawings illustrating a preferred form of the invention. The drawings and description are illustrative only, however, and are not intended to limit the invention except insofar as it is limited by the claims.

Figure 1:
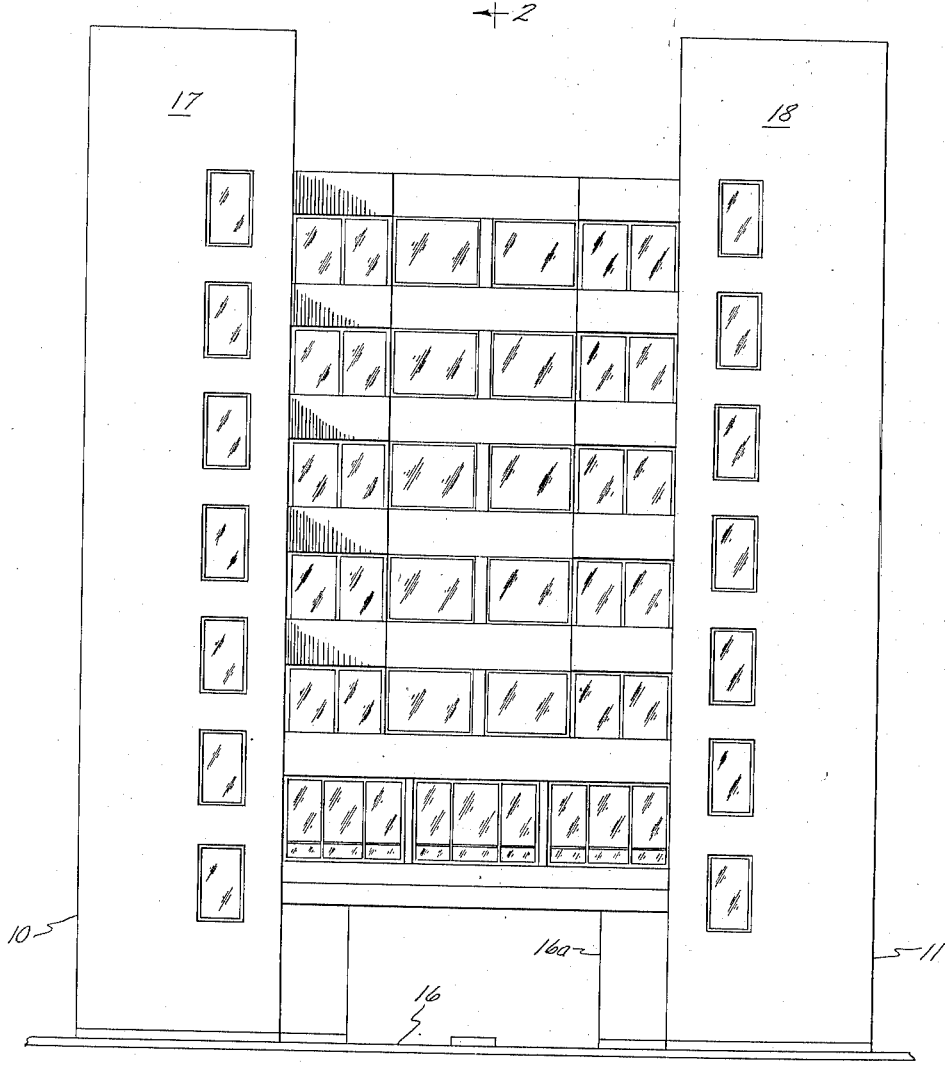
Figure 1 is a front elevational view of a motor lodge embodying my invention.

Referring now in detail to the drawings, my new motor lodge construction as shown, embodies a main structure comprising outer side walls 10 and 11 and an outer rear wall 12. Below the ground or street level a front wall 13 is also provided. These walls and other wall structures may be of any suitable construction such as reenforced concrete. A floor 14 at the bottom of the structure has an elevator pit 15 extending across the entire building. Within the walls just referred to I provide a street level car lobby 16 which is open toward the front of the building in order that automobiles may drive into it directly from the street. At the sides of the car lobby 16, towers 17 and 18 are provided. These towers have stairways 19 and 20 therein and have elevators 21 and 22 therein to carry people upwardly. Immediately over the car lobby 16 is a lounge and registration room 23 where the management of the motel and the usual lounge conveniences for the guests are provided. Immediately to the rear of the car lobby 16 and the room 23, the building has an open area 24 extending down to the pit 15 and extending across the building from the side wall 10 to the side wall 11. In this area an automobile parking device 25 is mounted to travel to and fro on rails 26 and 27 in the pit 15. The parking device carries means to pick up cars in the lobby 16 and store them in the space to the rear of the area 24 and in the space beneath the car lobby 16. The parking device will be described later herein in sufficient detail to show how it operates. However, the particular parking device is a known structure and the details thereof are not important to the present invention.

The structure as shown has five stories above the level of the lounge room 23, each story comprising a series of lodging units 28 and 32, arranged in a U-shaped row along the side walls 10 and 11 and the rear wall 12. A hall 29 at each story extends from the tower 17 rearwardly between the wall 10 and units 28 next to that wall to the rear wall 12. A hall 30 at each story, extends from the tower 18 rearwardly between the wall 11 and units 28 next to that wall to the rear wall 12. The halls 29 and 30 are connected by a hall 31 that extends along the rear wall 12 behind the units 32 that are at the base of the U-shaped row of lodging units. As shown, there are ten lodging units on each floor, eight of which are the single room, porch and bath units 28, and two of which are the two room, porch and bath units 32. Each unit has a door 33 to one of the side halls 29 or 30. It also has doors 34 facing toward the front of the building. These doors provide access to the porch of the unit. Thus each lodging unit has front and back doors and a front view.

Figure 2:
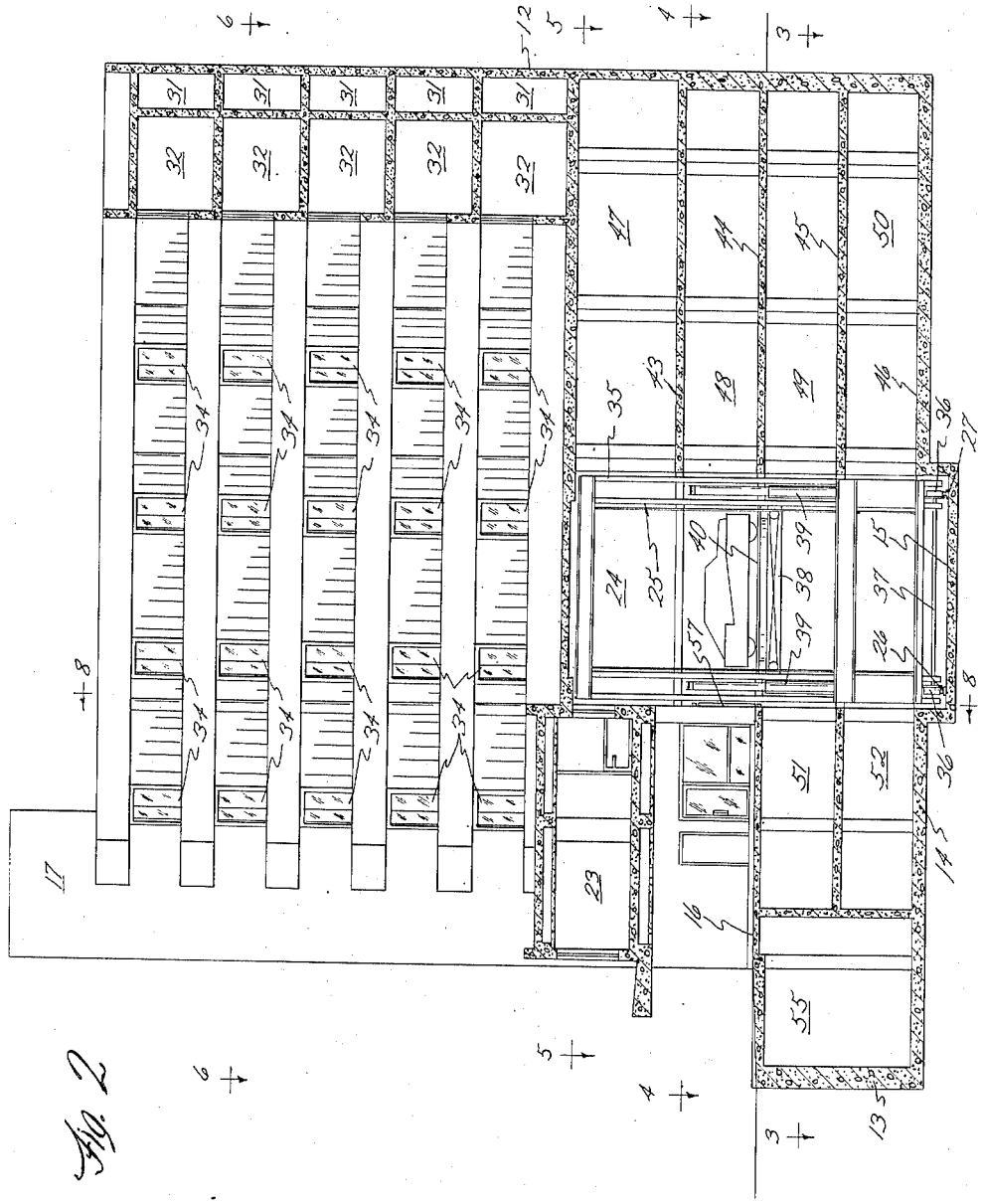
Figure 2 is a sectional view taken on the line 2—2 of Figure 1.
Figure 3:
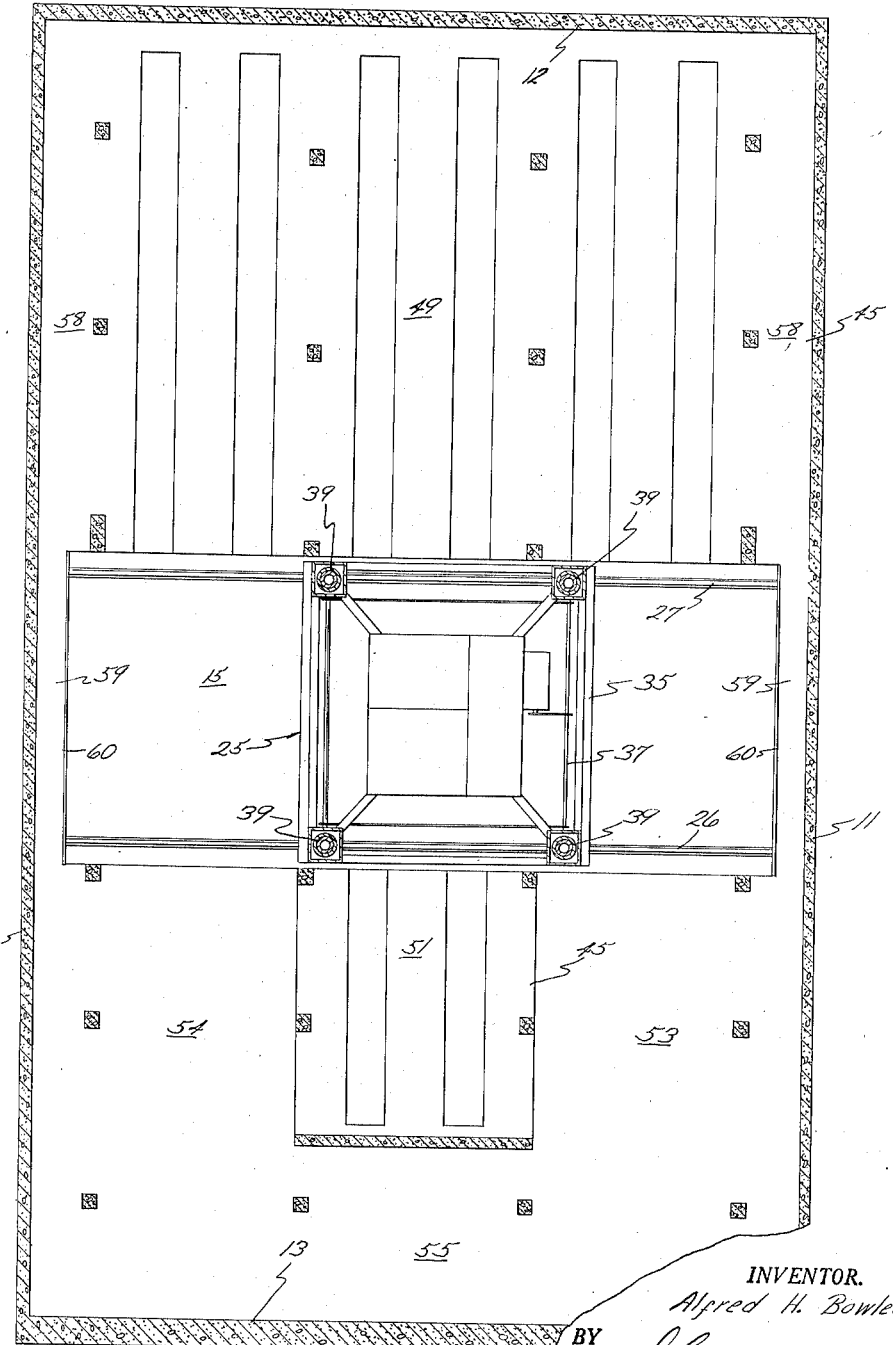
Figure 3 is a sectional view taken on the line 3—3 of Figure 2.
Figure 4:
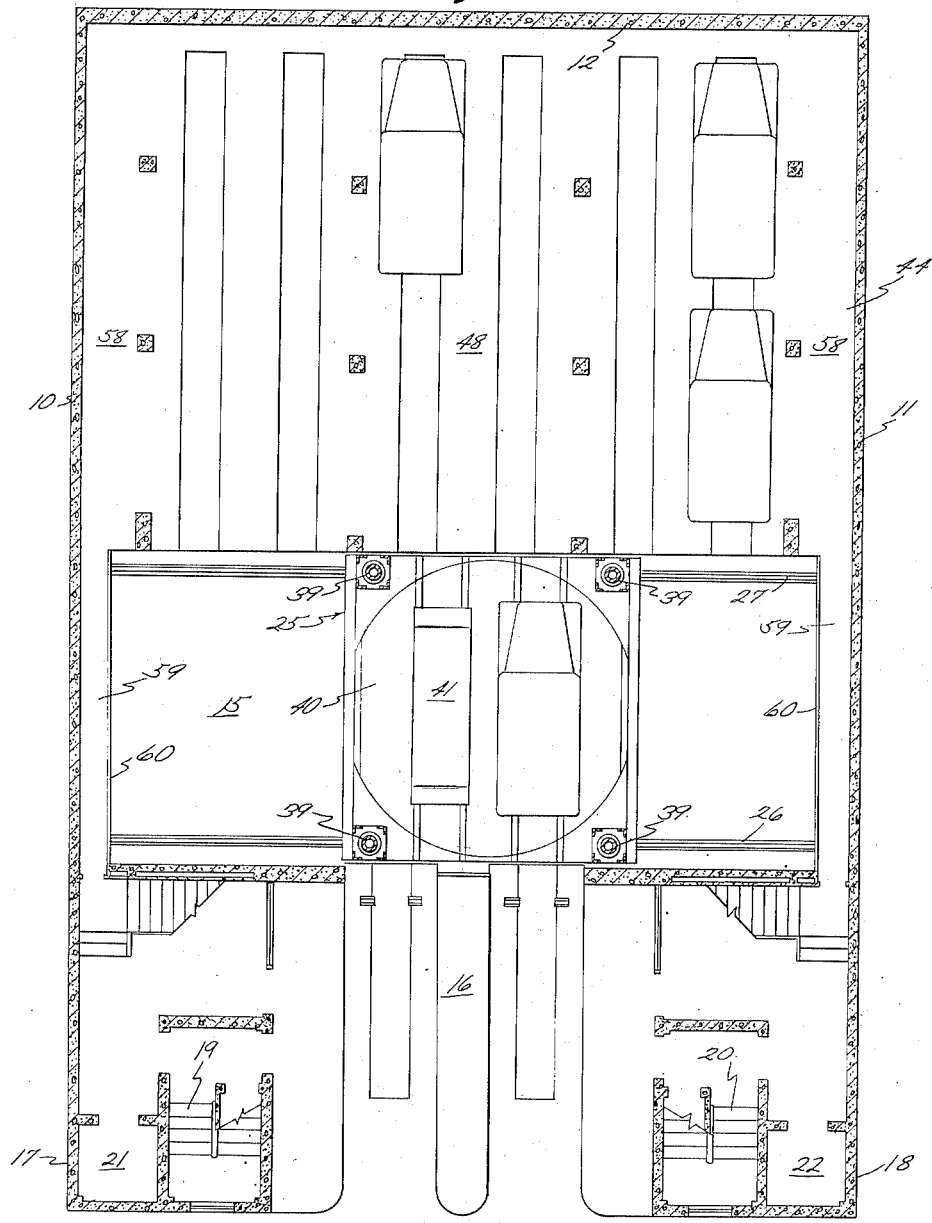
Figure 4 is a sectional view taken on the line 4—4 of Figure 2.
Figure 5:
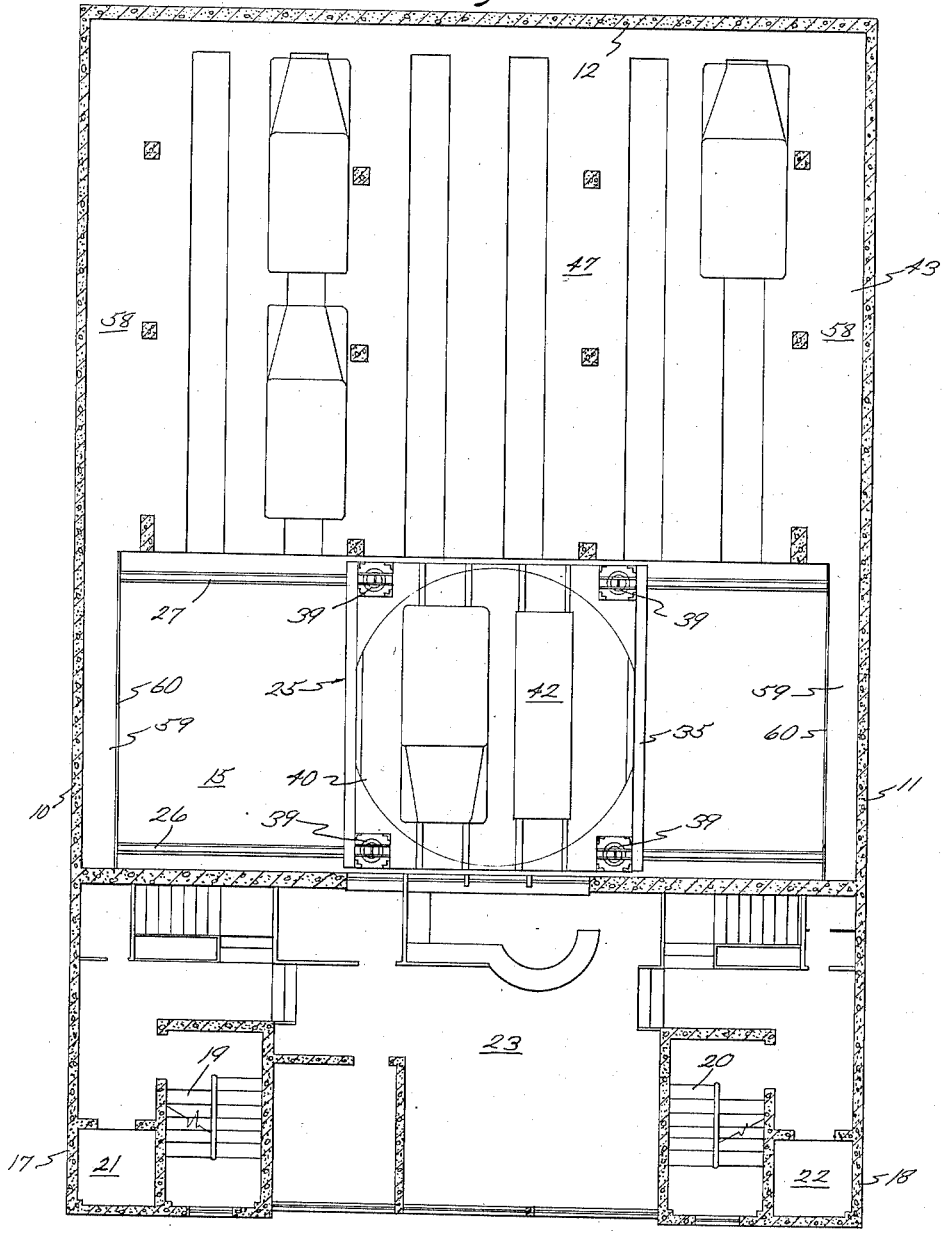
Figure 5 is a sectional view taken on the line 5—5 of Figure 2.
Figure 6:
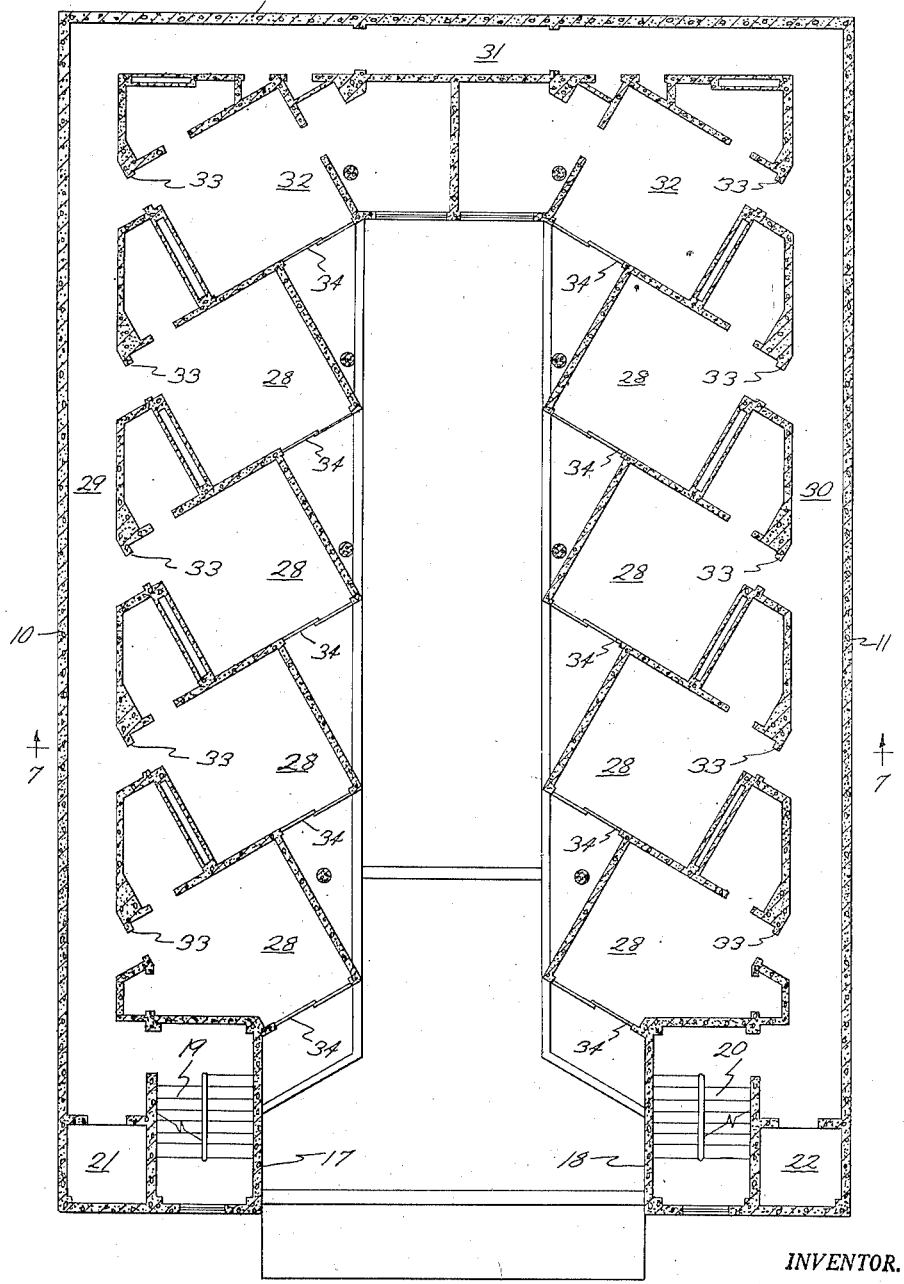
Figure 6 is a sectional view taken on the line 6—6 of Figure 2.
Figure 7:
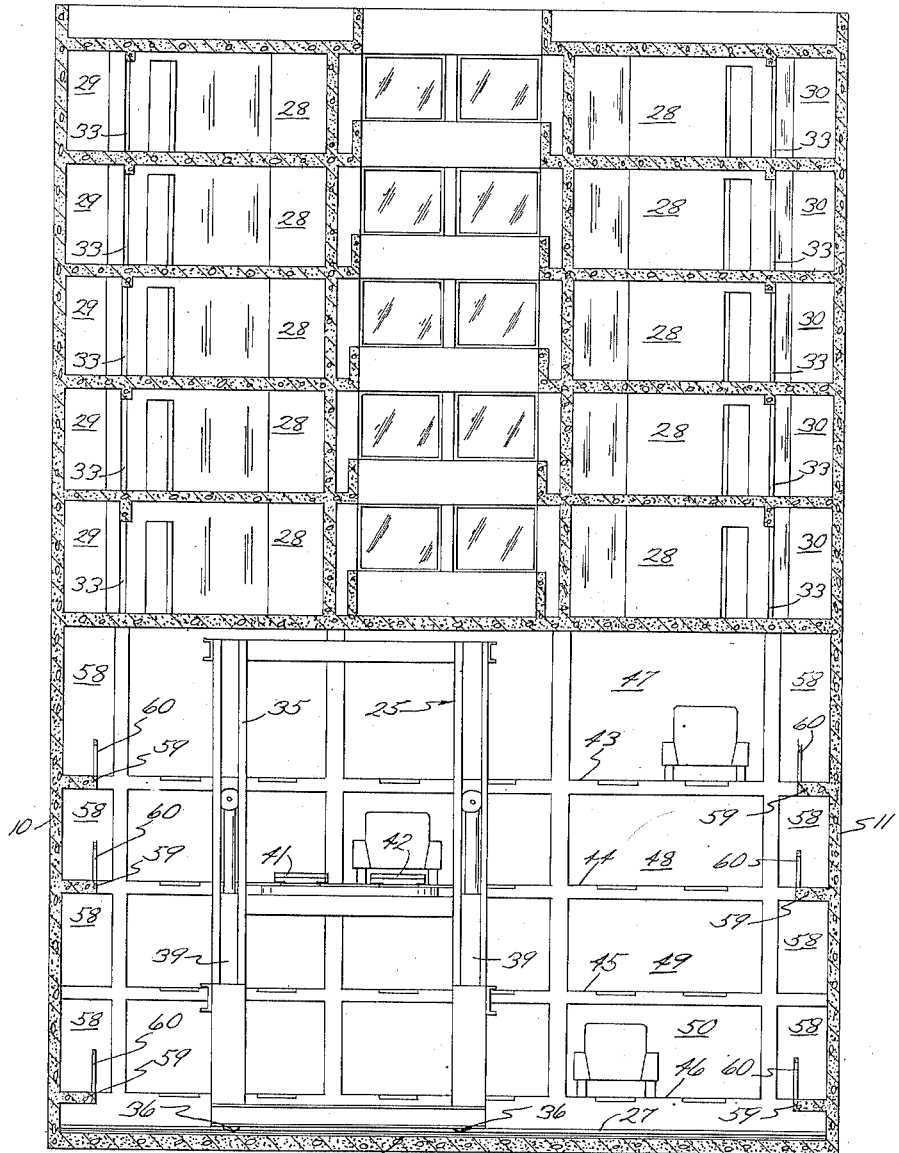
Figure 7 is a sectional view taken on the line 7—7 of Figure 6.
Figure 8:
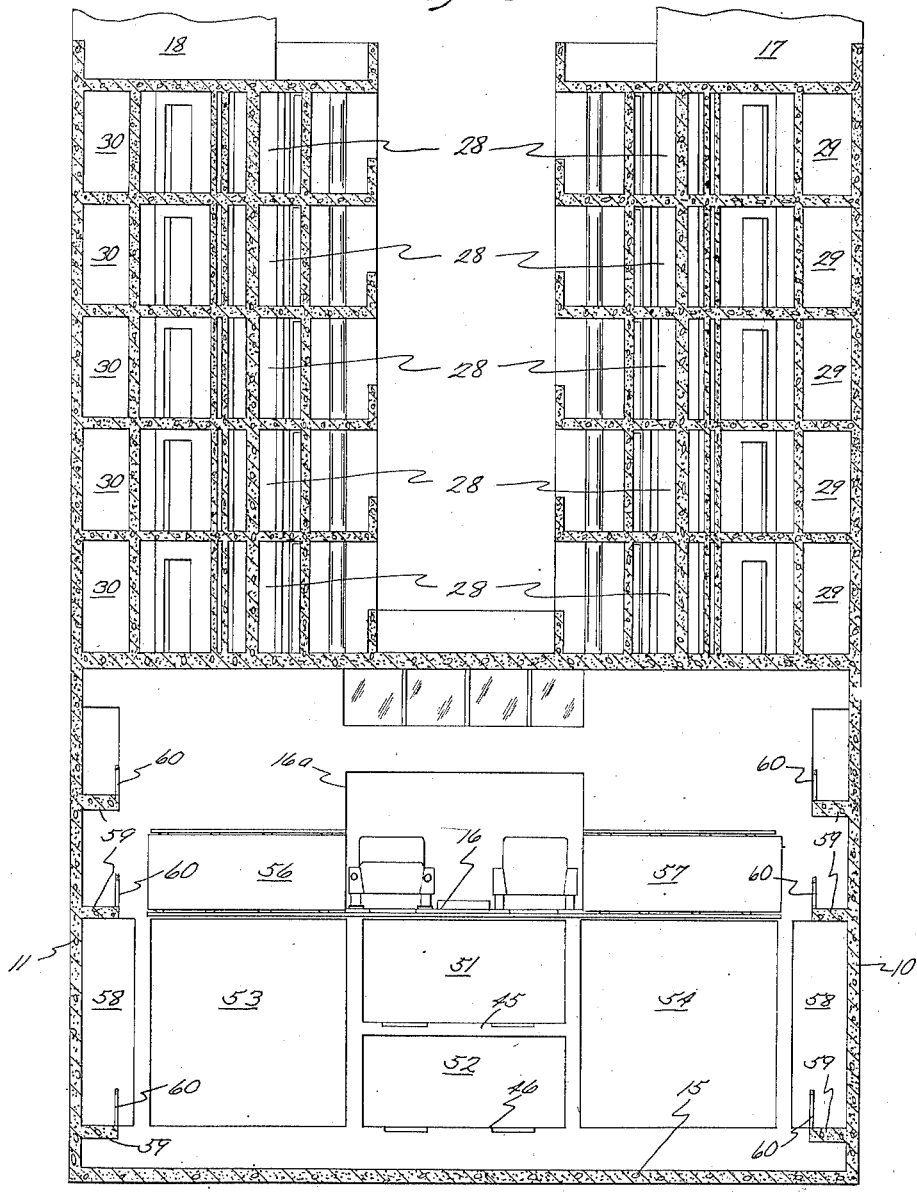
Figure 8 is a sectional view taken on the line 8—8 of Figure 2.

As best illustrated in Figures 2, 4, 5, 7 and 8, the parking device 25 comprises a framework 35 which is mounted by wheels 36 on the rails 26 and 27 for movement lengthwise by suitable power means (not shown) connected to the shafts 37 of the wheels 36. Within the framework 35 an elevator platform 38 is mounted and this platform is raised and lowered by hydraulic jacks 39 in the four corners of the framework 35. The platform 38 carries a turntable 40 with suitable power means (not shown) for rotating the turntable. On the turntable 40 there are two car lifting trucks 41 and 42 that can be run under an automobile and then raised to lift the automobile and move it onto the turntable 40 and off again. The trucks 41 and 42 carry their own power units and are operated from the turntable. The details of the truck operating mechanism and the turntable operating mechanism are known and are shown, for example, in the U. S. patent application, Serial No. 382,543, on Parking System for Automobiles. However, any other suitable parking device may be used.

With the parking device, 25 automobiles can be picked up in the car lobby, after they have been locked, and taken upon the turntable 40. Then they can be moved to any one of four floor levels 43, 44, 45 and 46, and placed in one of the compartments 47, 48, 49 and 50 behind the area 24 at the said floor levels. Additional compartments 51 and 52 are provided at the floor levels 45 and 46 in front of the area 24 for other cars. There are additional compartments 53, 54 and 55 in front of the area 24 below the car lobby level for heating, air conditioning, maintenance and other equipment necessary for operation of the motel.

In order to prevent accidental entry into the area 24 from the car lobby the car entry opening 16a is provided with doors 56 and 57 that are kept closed except when the turntable 40 is taking on or delivering cars at the car lobby level.

It will be noted that there is an automobile parking space for each of the lodging units. Each of the compartments 47, 48, 49 and 50 hold four automobiles. There are three compartments 47 on the floor 43 and a like number on each of the lower floors so that 48 automobiles may be stored behind the area 24. The compartments 51 and 52 hold four more automobiles so that even in the event of complete occupancy there are two spare automobile spaces. The turntable 40 makes it possible to remove any automobile called for at any time. If the automobile called for happens to be behind another automobile, the operator merely takes the front automobile onto the turntable, turns the turntable half way around, then brings the desired car onto the turntable, and by turning the turntable half way around again, he can put the automobile not wanted back in the compartment.

It will be observed that at each floor 43, 44, 45 and 46, there is a space 58 next to each wall 10—11 and across the ends of the pit 15. There are walks 59 protected by rails 60 so that a guest may enter any compartment and get into his automobile while it is stored. Thus the guest has all of the advantages of access to his automobile that he would have in the ordinary motel. The automobiles remain locked except when unlocked by the owner. They are not driven by anyone else.

It is believed that the nature and advantages of my invention will be apparent from the foregoing description.

Having thus described my invention, I claim:

1. A motor lodge structure comprising a multiple story building having a street level front car lobby open to the front for automobiles to drive into the structure, towers at both sides of said lobby having means to carry people upwardly therein, the building having a lounge and registration room above the car lobby and having lodging rooms arranged in an U-shaped row in each story thereof above the lounge room level and having halls leading from said towers along the outside of said rooms providing access to said rooms, the building having an elevator well extending across it immediately behind the car lobby and having automobile storage compartments behind the car lobby extending from said elevator well at the lounge room level and below to the floor of the structure providing individual automobile storage for the several lodging rooms, the building having an open inner court beginning at the story above the lounge room level upon which court each of the lodging rooms opens, and an automobile elevating tower movable lengthwise of said elevator well and having car loading and elevating means thereon operable to pick up automobiles in said car lobby and transfer them to the compartments and return them.

2. A motor lodge structure comprising in combination a multiple story building having a street level front car lobby open for automobiles to drive into, said building having a plurality of upper levels above the lobby divided into lodging units of rooms, halls leading to said rooms and elevator towers for taking guests from lobby to floors on upper levels, said building having an automobile elevating area immediately behind the car lobby, an elevator device movable in said area laterally and vertically, said device having means thereon to pick up automobiles from said lobby and move them into said area, said building having compartments below the lodging unit levels opening upon said elevator area into which said elevator device deposits the automobiles picked up in said lobby.

3. A motor lodge structure comprising in combination a multiple story building having a street level front car lobby open for automobiles to drive into, said building having a plurality of upper levels above the lobby divided into lodging units of rooms, halls leading to said rooms and elevator towers for taking guests from lobby to floors on upper levels, said building having an automobile elevating area immediately behind the car lobby, an elevator device movable in said area laterally and vertically, said device having means thereon to pick up automobiles from said lobby and move them into said area, said building having compartments below the lodging unit levels opening upon said elevator area into which said elevator device deposits the automobiles picked up in said lobby, said compartments being on the opposite side of said automobile elevating area from the car lobby, and arranged one above the other.

4. A motor lodge structure comprising in combination a multiple story building having a street level front car lobby open for automobiles to drive into, said building having a plurality of upper levels above the lobby divided into lodging units of rooms, halls leading to said rooms and elevator towers for taking guests from lobby to floors on upper levels, said building having an automobile elevating area immediately behind the car lobby, an elevator device movable in said area laterally and vertically, said device having means thereon to pick up automobiles from said lobby and move them into said area, said building having compartments below the lodging unit levels opening upon said elevator area into which said elevator device deposits the automobiles picked up in said lobby, said compartments being on the opposite side of said automobile elevating area from the car lobby, and arranged one above the other, and passageways across the elevating area providing access to the automobiles stored in said compartments.

5. A motor lodge structure comprising in combination a multiple story building having a street level front car lobby open for automobiles to drive into, said building having a plurality of upper levels above the lobby divided into lodging units of rooms, halls leading to said rooms and elevator towers for taking guests from lobby to floors on upper levels, said building having an automobile elevating area immediately behind the car lobby, an elevator device movable in said area laterally and vertically, said device having means thereon to pick up automobiles from said lobby and move them into said area, said building having compartments below the lodging unit levels opening upon said elevator area into which said elevator device deposits the automobiles picked up in said lobby, said room units each having a door opening toward the front car lobby on the side thereof remote from the halls.

6. A motor lodge structure comprising in combination a multiple story building having a street level front car lobby open for automobiles to drive into, said building having a plurality of upper levels above the lobby divided into lodging units of rooms, halls leading to said rooms and elevator towers for taking guests from lobby to floors on upper levels, said building having an automobile elevating area immediately behind the car lobby, an elevator device movable in said area laterally and vertically, said device having means thereon to pick up automobiles from said lobby and move them into said area, said building having compartments below the lodging unit levels opening upon said elevator area into which said elevator device deposits the automobiles picked up in said lobby, said room units each having a door opening toward the front car lobby on the side thereof remote from the halls, and a porch outside said door.

7. A motor lodge structure comprising in combination a multiple story building having a street level front car lobby open for automobiles to drive into, said building having a plurality of upper levels above the lobby divided into lodging units of rooms, halls leading to said rooms and elevator towers for taking guests from lobby to floors on upper levels, said building having an automobile elevating area immediately behind the car lobby, an elevator device movable in said area laterally and vertically, said device having means thereon to pick up automobiles from said lobby and move them into said area, said building having compartments alongside the elevating area, and separated from the car lobby and opening upon said elevator area into which said elevator device deposits the automobiles picked up in said lobby.

8. A motor lodge structure comprising in combination a multiple story building having a street level front car lobby open for automobiles to drive into, said building having a plurality of upper levels above the lobby divided into lodging units of rooms, halls leading to said rooms and elevator towers for taking guests from lobby to floors on upper levels, said building having an automobile elevating area immediately behind the car lobby, an elevator device movable in said area laterally and vertically, said device having means thereon to pick up automobiles from said lobby and move them into said area, said building having compartments alongside the elevating area, and separated from the car lobby and opening upon said elevator area into which said elevator device deposits the automobiles picked up in said lobby, and passageways across the elevating area providing access from the car lobby to automobiles stored in said compartments.

References Cited in the file of this patent
UNITED STATES PATENTS

| | | |
|---|---|---|
| 1,841,530 | Geiger | Jan. 19, 1932 |
| 2,626,065 | Sanders et al. | Jan. 20, 1953 |